(12) United States Patent
Iselt et al.

(10) Patent No.: US 8,777,657 B2
(45) Date of Patent: Jul. 15, 2014

(54) CONNECTION TERMINAL BLOCK

(75) Inventors: Torsten Iselt, Kempten (DE); Peter Seefeld, Pfronten (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 84 days.

(21) Appl. No.: 13/642,185

(22) PCT Filed: Mar. 23, 2011

(86) PCT No.: PCT/EP2011/054399
§ 371 (c)(1),
(2), (4) Date: Oct. 19, 2012

(87) PCT Pub. No.: WO2011/131440
PCT Pub. Date: Oct. 27, 2011

(65) Prior Publication Data
US 2013/0034987 A1 Feb. 7, 2013

(30) Foreign Application Priority Data
Apr. 19, 2010 (DE) .......................... 10 2010 027 911

(51) Int. Cl.
*H01R 4/38* (2006.01)
(52) U.S. Cl.
USPC ............................. 439/382; 439/801; 439/810
(58) Field of Classification Search
USPC ........................... 439/382–385, 801, 810, 813
See application file for complete search history.

(56) References Cited

U.S. PATENT DOCUMENTS

| 1,839,623 | A | | 1/1932 | Waddell |
| 5,052,950 | A | | 10/1991 | Wilson |
| 5,533,913 | A | * | 7/1996 | Boehm et al. ................. 439/810 |
| 8,152,573 | B2 | * | 4/2012 | Bauer et al. ................... 439/782 |

FOREIGN PATENT DOCUMENTS

| DE | 25 34 095 A1 | 2/1977 |
| DE | 28 05 815 B1 | 7/1979 |
| DE | 40 20 167 C1 | 6/1991 |
| DE | 102 25 240 A1 | 12/2003 |
| GB | 2 006 794 A | 5/1979 |
| GB | 1 574 107 A | 9/1980 |

OTHER PUBLICATIONS

German Search Report in 10 2010 027 911.0, issued Feb. 17, 2011.
International Search Report in PCT/EP2011/054399, issued Jun. 17, 2011.
International Preliminary Report on Patentability in PCT/EP2011/054399, issued Oct. 23, 2012, English translation thereof.

* cited by examiner

*Primary Examiner* — Xuong Chung Trans
(74) *Attorney, Agent, or Firm* — Bacon & Thomas, PLLC

(57) ABSTRACT

An apparatus for connecting a measuring transducer with a control/evaluation unit, wherein at least one clamping apparatus is placed on a molded part. The clamping apparatus serves for producing a connection between at least one connecting line of the measuring transducer and at least one connecting line of the control/evaluation unit, wherein a soldering tab is provided, which serves for producing a soldered connection between the connecting line of the measuring transducer and the clamping apparatus, and wherein the soldering tab is embodied at least partially in such a manner so as, and serves, to damp possibly occurring vibrations.

14 Claims, 3 Drawing Sheets

CONNECTION TERMINAL BLOCK

TECHNICAL FIELD

The invention relates to an apparatus for connecting a measuring transducer with a control/evaluation unit, wherein at least one clamping apparatus is placed on a molded part, wherein this clamping apparatus serves for producing a connection between at least one connecting line of the measuring transducer and at least one connecting line of the control/evaluation unit, wherein a soldering tab is provided, and wherein this soldering tab serves for producing a soldered connection between the connecting line of the measuring transducer and the clamping apparatus.

BACKGROUND DISCUSSION

Measuring transducers designed for process measurements technology usually contain temperature sensor elements, such as thermocouples, temperature measuring resistors made of helically wound wire or thin film measuring resistors. The measuring transducer is in such case most often in the form of a measuring insert accommodated in a protective tube, wherein the protective tube in turn extends, for example, into a container, where a material to be measured is located. The open end of the protective tube is, in such case, led to a connection housing, in which are provided at least connection clamps for connecting the measuring insert with a control/evaluation unit, which is, for example, located at a distance therefrom. Additionally, in the connection housing, a preprocessing of a measurement signal recorded by means of the measuring insert can take place. Such measuring inserts are, in given cases, exposed to drastic temperature fluctuations and mechanical loadings, which originate, for example, from pressure surges in pipelines or are transmitted from protective tube vibrations or other plant components.

Known from the state of the art is the use of clamping screws for affixing the bared cable ends of the connecting line from the control/evaluation unit, wherein these clamping screws are usually held in ceramic blocks. The bared cable ends are then radially inserted from the outside in provided clamping passageways, and then affixed by tightening the clamping screws. In such case, the danger exists that the cables are damaged, especially due to the screwdriver sliding off during tightening of the clamping screws.

Since the clamping screws are rigidly fixed in location, the cables must be subjected to a bending procedure, in order to orient the bared cable ends. In order to assure this orientation of the cables, the cable ends must be bent. Additionally, cables in contact with each other can be damaged by the influence of vibrations. This can lead to fatigue cracking of the cable ends or to rubbing—which, among other things, can result in damage to the cable insulation—whereby shunting or short circuiting can result.

Vibrations can, moreover, contribute to loosening of the securement clamps, wherein due to constant shaking or vibration effects, the bared cable ends can be pushed together, so that an additional short circuiting or shunting risk results.

SUMMARY OF THE INVENTION

An object of the invention is consequently to provide between the connecting lines of the measuring transducer and the connecting lines of the control/evaluation unit a connection, which is more robust against vibrations and/or other damaging, environmentally related influences.

The object is achieved according to the invention by features including that the soldering tab is embodied at least partially in such a manner so as, and serves, to damp possibly occurring vibrations.

Especially, the soldering tab can serve to damp the transmission of possibly occurring vibrations—especially from the molded part and/or the clamping apparatus—to the soldered connection. Furthermore, the soldering tab can serve to damp the transmission of possibly occurring vibrations from the molded part or the clamping apparatus to the connecting line to the measuring transducer. The soldering tab can also serve to damp the transmission of possibly occurring vibrations from the connecting lines from the measuring transducer to the clamping apparatus and/or the connecting lines to the control/evaluation unit.

Since the connecting lines often—and particularly in the case of thermometers—are in the form of mineral insulated, sheathed cables, which are relatively rigid, and only weakly damp received vibrations, an idea of the invention is to damp possibly occurring vibrations by means of the soldering tab. The soldering tab can be embodied in a corresponding manner for such purpose. For example, the soldering tab can be correspondingly formed or otherwise functionalized. By, Mainly mechanical oscillations are referenced with the term "vibrations". Especially due to vibrations or mechanical oscillations with a particular frequency, phase or amplitude, which are coupled in, for example via the connecting lines, damage can occur, for instance damage to the clamping apparatus and/or to the soldered connection connecting the clamping apparatus with the connecting line from the measuring transducer or even damage to the connecting lines themselves, i.e. to the connecting lines of the control/evaluation unit and/or the connecting lines of the measuring transducer.

The soldering tab can serve for producing the soldered connection between the connecting line of the measuring transducer and the connecting line of the control/evaluation unit via the clamping apparatus. For such purpose, a portion of the soldering tab can be soldered, for example, with the connecting line of the measuring transducer, wherein the soldering tab is, in turn, connected with the clamping apparatus. Additionally, the soldering tab can also serve to at least partially mechanically decouple the connecting line of the measuring transducer from the clamping apparatus, the connecting lines of the control/evaluation unit, the molded part, the protective tube and/or other housing or plant part. The portion of the soldering tab adjoining the portion of the soldering tab provided for producing the soldered connection can be correspondingly embodied for such purpose. Preferred embodiments are described in the following paragraphs. Due to the, for example, resilient, especially damping effect of the soldering tab, the solder point lying, due to the soldering procedure, between the connecting line of the measuring transducer and the connecting line of the control/evaluation unit can be protected against mechanical loadings in the form of, for instance, shocks and vibrations. The soldering tab can in such case be secured on the clamping apparatus, or alternatively it can be embodied as a single piece with the clamping apparatus. Various clamps known by electrical or electronics engineers, such as e.g. spring tension clamps or screw clamps, can be used for the clamping apparatus.

In an embodiment, the measuring transducer serves for sensing a physical and/or chemical process variable, especially a temperature, and the control/evaluation unit serves for processing a measurement signal originating from the measuring transducer, wherein the connecting lines serve to transfer the measurement signal from the measuring transducer to the control/evaluation unit. The measuring transducer includes, for example, a sensor element, which serves for sensing the physical and/or chemical process variable, respectively for transducing the process variable into the measurement signal. The connecting lines can then serve for transferring this measurement signal. Thus, the sensor element has connecting lines and the control/evaluation has connecting lines and these are connected together by the clamping apparatus. Additionally, the sensor element can be supplied via its connecting lines—and in given cases also via the connecting lines of the control/evaluation unit—with an electrical voltage required for operation, or with electrical current required for operation.

In an additional embodiment, the soldering tab is multiply folded, especially in a meandering manner, preferably in a V-, N- or M-shaped manner. Especially for damping possible vibrations, the soldering tab can be folded in a preferably accordion like manner, and thus have a zig zag shaped profile. The soldering tab can, for example, also be made of portions composed of different materials. The soldering tab, and/or the portion of the soldering tab serving for damping vibrations and correspondingly embodied for such, can be matched as regards its damping characteristics to the frequency and/or amplitude of the vibrations, in given cases, arising. Furthermore, the soldering tab can, for this purpose, be manufactured of a material, which likewise is matched as regards its damping characteristics to the vibrations in given cases occurring, for example, during operation of the measuring apparatus, in which the proposed apparatus is to be installed.

In an additional embodiment, both the connecting line of the measuring transducer as well as also the connecting line of the control/evaluation unit are sheathed cable, especially mineral insulated, sheathed cable. As already mentioned, mineral insulated, sheathed cables are characterized especially by a high bending stiffness and thus are relatively inelastic. This can lead to damage in the orienting of the connecting line. Due to the high bending stiffness, nearly undamped conduction of vibrations occur on the, especially mineral insulated, sheathed cable. The soldering tabs can, in such a case, be composed, for example, at least partially, of a more easily bendable material than the connecting lines, and thereby damp the transmission of vibrations.

In an additional embodiment, the clamping apparatus serves furthermore for accommodating and for securing a bared end of the connecting line of the control/evaluation unit.

In an additional embodiment, the clamping apparatus includes a passageway for accommodating the bared end of the connecting line. The passageway can, in such case, especially extend centrally from one side of the clamping apparatus to the other side of the clamping apparatus, which especially that lying opposite the first side.

In an additional embodiment, the soldering tab serves as a limit to the introduction of the bared end of the connecting line into the passageway. The soldering tab can, in such case, be bent or folded in such a manner, that it limits the lengthwise extension of the passageway. In this way, a defined receiving length can be created, which enables a likewise defined inserting of the connecting line into the passageway.

In an additional embodiment, the clamping apparatus is connected in a movable and especially rotatable manner with the molded part, and is especially secured to the molded part. Via the movable and especially rotatable connection between molded part and clamping apparatus, the introduction of the especially bared ends of the connecting line into the passageway can be made easier. Of, advantage in such case is that the connecting line no longer needs to be bent in a complicated manner, in order to be inserted into the passageway. Especially in the case of mineral insulated, sheathed cables as they are used in connection housings in the case of high environmental temperatures for connection with the control/evaluation unit, such a bending into shape is cumbersome and can lead to damage of the connecting lines.

Alternatively, the clamping apparatus can also serve for accommodating and for affixing especially a bared end of the at least one connecting line of the measuring transducer. The connecting lines can then, for example, be connected with one another via a luster terminal. The clamping apparatus can then, consequently, also be connected in a movable and especially rotatable manner with the molded part, and especially be secured on the molded part, when no soldering tab is provided for connection with the connecting line of the measuring transducer.

In an additional embodiment, the clamping apparatus is seated in the molded part or in a seating secured on the molded part so as to be movable and especially rotatable about at least one axis. The seating can be, for example, a mechanical seating, such as, for example, a fixed seating or a loose seating or a combination of the two. The type of seating and the degree of freedom of orientation of the clamping apparatus can, in such case, be matched to the installation conditions of the apparatus, for example, in the connection housing.

In an additional embodiment, the clamping apparatus, especially a clamping apparatus secured in a movable manner, serves for accommodating the bared end of the connecting line of the control/evaluation unit in a manner essentially aligning with the end of the sheathed cable, and/or for protecting against damaging due to possible vibrations. Due to the degree of freedom provided by means of the movable clamping apparatus, a damping of vibrations and a partial mechanical decoupling between the molded part, the connecting lines and/or connecting lines or the solder joint can likewise occur. Since the clamping apparatus is seated in a partially movable manner, the clamping apparatus can additionally be oriented and the introduction and clamping of the connecting line of the control/evaluation unit can be facilitated.

In an additional embodiment, the clamping apparatus is essentially a clamping screw unit for securing the bared end of the connecting line of the control/evaluation unit.

In an additional embodiment, the clamping apparatus includes a clamp body, which is secured—especially seated—in a rotatable manner on the molded part.

In an additional embodiment, the clamp body has a screw thread, into which a clamping screw can be screwed, wherein clamp body, clamping screw and screw thread interact in such a manner that, in the case of screwing in the clamping screw, the bared end of the connecting line of the control/evaluation unit becomes secured.

BRIEF DESCRIPTION OF THE DRAWINGS

The invention will now be explained in greater detail based on the appended drawing, the figures of which show as follows:

FIG. 3b is a schematic representation of a clamping screw with a clamping element for mounting on the clamp body of FIG. 3a.

DETAILED DISCUSSION IN CONJUNCTION WITH THE DRAWINGS

Figure 1:
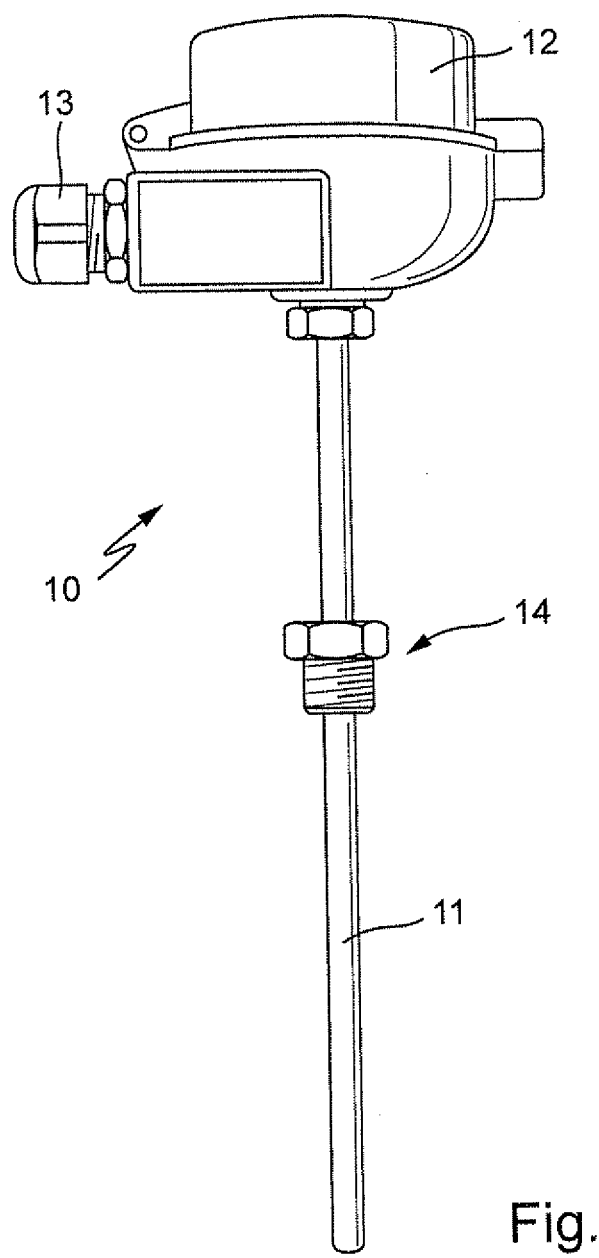
FIG. 1 is a schematic representation of a measuring apparatus for determining a process variable.
Figure 2:
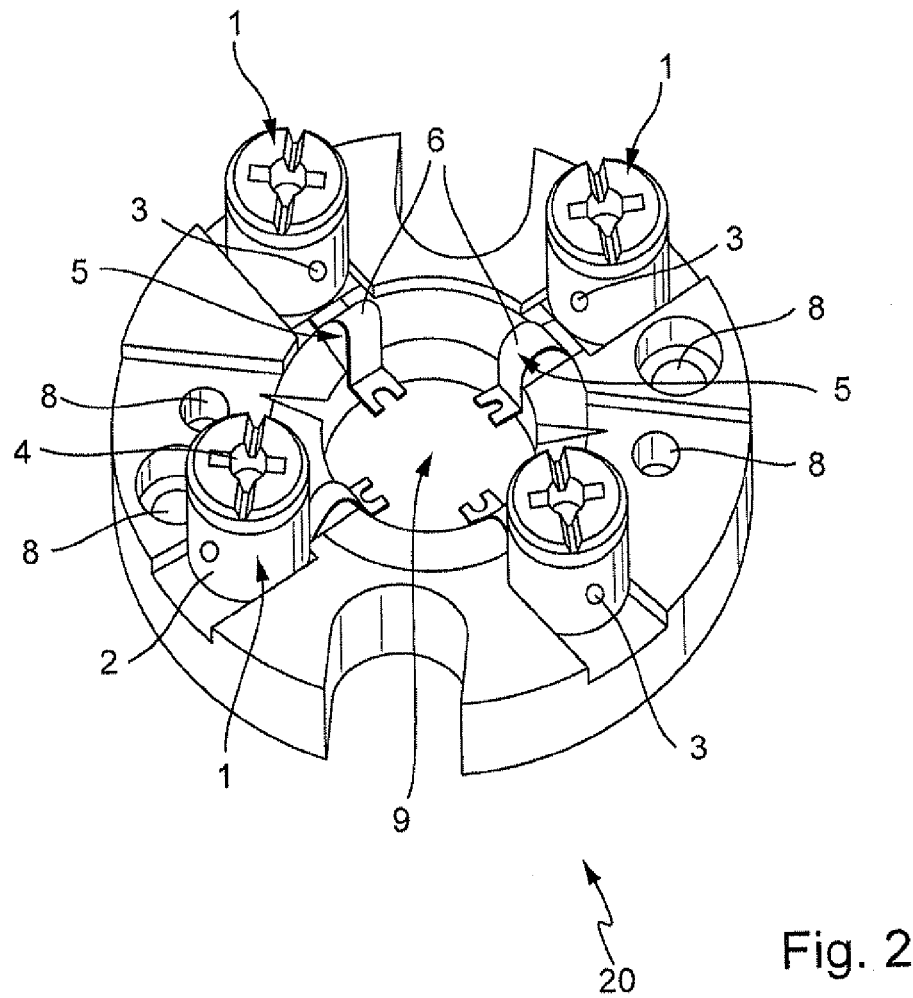
FIG. 2 is a schematic representation of a connection terminal block of the measuring apparatus.

FIG. 1 shows a measuring apparatus 10 for determining a process variable, as such an apparatus is used, for example, in a plant of process automation technology for determining temperature. Measuring apparatus 10 is composed, in such case, essentially of a protective tube 11 and a connection housing 12, wherein protective tube 11 and connection housing 12 are connected with one another. Located in protective tube 11 is a measuring transducer—here in the form of a so-called measuring insert (not shown)—for sensing temperature. This measuring insert includes a sensor element, arranged in the tip of the protective tube. The sensor element is connected via connecting lines with the connection housing 12. Located in the connection housing 12 is a control/evaluation unit (not shown), for example, in the form an electronics, for preprocessing and/or further processing a measurement signal coming from the sensor element. The control/evaluation unit is, in such case, connected via connecting lines with the connecting lines of the sensor element. Due to the modularity of measuring apparatus 10 and/or for mounting measuring apparatus 10, the need exists to connect the connecting lines of the measuring transducer with the connecting lines of the control/evaluation unit arranged in the connection housing 12. FIG. 2 shows an embodiment of the apparatus provided therefor. The cable lead in 13 shown in FIG. 1 serves for further connecting of the measuring apparatus 10 e.g. with a remote control room. Via the process connection 14, the measuring apparatus 10 can be connected, for example, to a container in which the measured material is located.

FIG. 2 shows a schematic representation in the form of a perspective view of an embodiment of the provided apparatus, which in the following is also called a connection terminal block 20. Connection terminal block 20 has a number of clamping apparatuses 1, wherein these clamping apparatuses 1 serve for contacting the connecting lines of the measuring transducer, and which are here arranged on the upper side of a molded part 7. In FIG. 2, by way of example, four clamping apparatuses 1 are shown. Instead of the four clamping apparatuses 1 shown in FIG. 2, a different number of clamping apparatuses 1 can also be provided.

Molded part 7 is composed, for example, of a ceramic, and is matched to the installation conditions, for example, as are predetermined in connection with connection housing 12 or protective tube 11. The clamping apparatuses 1 for connecting the connecting lines are, in such case, symmetrically arranged in an essentially circular manner around a central bore 9 on molded part 7. The central bore 9 serves, in such case, for accommodating the connecting lines of the measuring transducer. These connecting lines which, for example, protrude at the point in time of mounting of measuring apparatus 10, out from the protective tube 11, in which the measuring insert is applied—can in each case be connected with a soldering tab 5. The connection can occur by means of a soldered connection between the soldering tab 5 and the connecting lines. The connecting lines of the measuring transducer are then connected with the clamping apparatuses 1 in an electrically conducting manner. Soldering tab 5 can, in such case, comprise, for example, a metal alloy or other material suitable for producing the soldered connection.

Each of the soldering tabs 5 includes, as shown in FIG. 2, a portion 6, which is bent in a V-shape and which serves for damping possible vibrations. Via these bent portions 6, vibrations between the connecting lines of the measuring transducer and the connection housing 12 and/or the protective tube 11 can be decoupled.

For securement with connection housing 12 and/or protective tube 11, connection terminal block 20 includes additional bores 8, through which can be led connecting means—such as, for example, screws, for securement—in order to connect the—molded part with protective tube 11 and/or with connection housing 12.

On the one hand, the connecting lines of the measuring transducer can thus be secured to the clamping apparatuses 1 from the inside via the central bore 9 of molded part 7. On the other hand, the connecting lines of the control/evaluation unit can be connected from the outside with the clamping apparatuses 1. For such purpose, the bared ends of the connecting lines are led through clamping passageways 3 provided therefor. For better orientation—especially more closely aligning orientation—of the connecting lines with the passageway 15 serving for accommodating the clamping apparatus 1, the clamping apparatuses 1 can be placed in a rotatable manner on molded part 7. In order to contact the connecting lines of the measuring transducer via the clamping apparatuses 1, a clamping screw 17, for example, can be used, by means of which the clamping apparatus 1 is tightened. Clamping screw 17 can additionally be equipped with a fine thread. Via the fine thread, a higher contact force of the clamping apparatus 1 can be achieved. A higher contact force is, in such case, advantageous for damping possible vibrations. Moreover, a helical spring (not shown) can be provided, which opposes the compressive force of the clamping screw 17. Via these measures, a vibration resistance of 60 g according to IEC60751 can be achieved. For better guiding of a tool used for tightening the clamping screw 17, clamping screw 17 can supplementally have a knurled or beaded screw head 4. Via the knurled or beaded screw head 4, a simpler and safer handling of the tool used in connection with the connection terminal block 20 is enabled.

It is furthermore evident from FIG. 2 that soldering tabs 5, especially the meanderingly formed portion 6, serve as a header-stop in the introduction of a connecting line of the control/evaluation unit through the clamping entrance and into the passageway of the clamping apparatus 1. The V-shaped portion of the soldering tab is, in such case, bent up to the height of an imaginary continuation of the passageway, and thereby enables a push-in stroke—especially a maximal push-in stroke—of connecting lines of the control/evaluation unit to be defined.

Figure 3A:
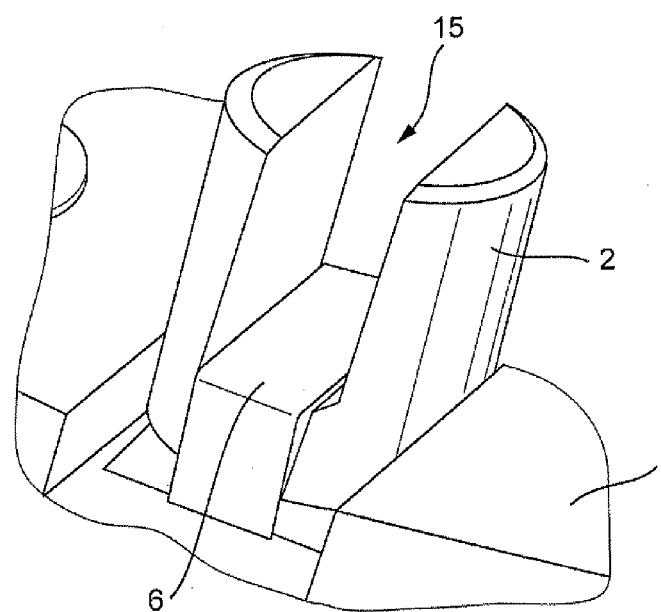
FIG. 3a is a schematic representation of a clamp body of a clamping apparatus of the connection terminal block.
Figure 3B:
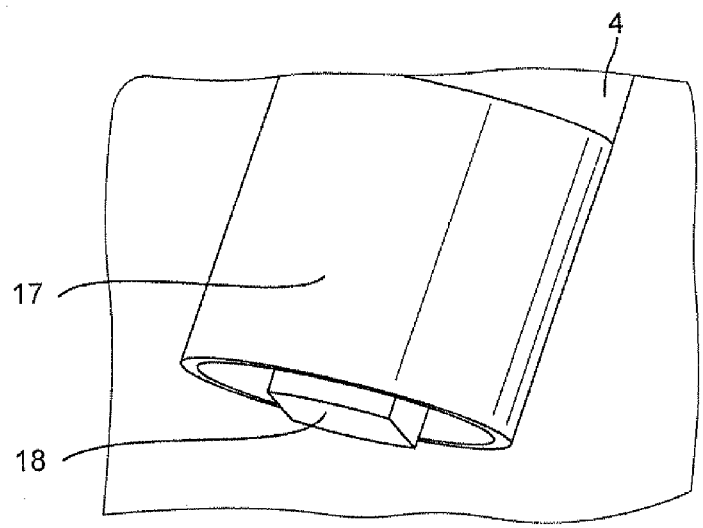

FIG. 3a) shows a schematic representation of a clamp body 2 and FIG. 3b) shows a representation of a clamping screw 17, which is screwable onto the clamp body 2. Clamp body 2 is, in such case, seated in a rotatable manner on the molded part 7, and includes an essentially cuboid-shaped passageway 15 for accommodating the connecting line. The clamp body 2 serves, in such case, as an opposing part for a clamping element 18, and includes an essentially flat contact surface 16. The clamping element 18 is, in such case, seated in a rotatable manner in clamping screw 17. Therewith, a transmission of the rotational movement of clamping screw 17 to the connecting line introduced into passageway 15 can be prevented, and a clamping connection can be achieved without damaging the connecting line in the case of tightening.

The invention claimed is:
1. An apparatus for connecting a measuring transducer with a control/evaluation unit, comprising:

a molded part;

at least one clamping apparatus placed on said molded part; and a soldering tab, wherein:

said clamping apparatus serves for producing a connection between at least one connecting line of the measuring transducer and at least one connecting line of the control/evaluation unit;

said soldering tab serves for producing a soldered connection between the connecting line of the measuring transducer and the clamping apparatus; and said soldering tab is embodied at least partially in such a manner so as, and serves, to damp possibly occurring vibrations.

2. The apparatus as claimed in claim 1, wherein:
said soldering tab serves to damp transmission of possibly occurring vibrations to said soldered connection.

3. The apparatus as claimed in claim 1, wherein:
the measuring transducer serves for sensing a physical and/or chemical process variable, especially a temperature, and the control/evaluation unit serves for processing a measurement signal originating from the measuring transducer; and said connecting lines serve to transfer the measurement signal between the measuring transducer and the control/evaluation unit.

4. The apparatus as claimed in claim 1, wherein:
said soldering tab multiply folded, especially in a meandering manner, preferably in a V-, N- or M-shaped manner.

5. The apparatus as claimed in claim 1, wherein:
both the connecting line of the measuring transducer as well as also the connecting line of the control/evaluation unit are a sheathed cable, especially mineral insulated, sheathed cable.

6. The apparatus as claimed in claim 1, wherein:
the clamping apparatus serves furthermore for accommodating and securing a bared end of the connecting line of the control/evaluation unit.

7. The apparatus as claimed in claim 6, wherein
the clamping apparatus has a passageway for accommodating the bared end of the connecting line.

8. The apparatus as claimed in claim 7, wherein:
said soldering tab serves as a limit to introduction of the bared end of the connecting line into the passageway.

9. The apparatus as claimed in claim 1, wherein:
the clamping apparatus is connected in a movable and especially rotatable manner with said molded part, and is especially secured to said molded part.

10. The apparatus as claimed in claim 1, wherein:
the clamping apparatus is seated in said molded part or in a seating secured on said molded part so as to be movable and especially rotatable around at least one axis.

11. The apparatus as claimed in claim 1, wherein:
the clamping apparatus, especially a clamping apparatus secured in a moveable manner, serves for accommodating the bared end of the connecting line of the control/evaluation unit in a manner essentially aligning with said passageway and/or the end of the sheathed cable, and/or for protection against damage due to possible vibrations.

12. The apparatus as claimed in claim 1, wherein:
the clamping apparatus is essentially a clamping screw unit for securing the bared end of the connecting line of the control/evaluation unit.

13. The apparatus as claimed in claim 1, wherein:
the clamping apparatus includes a clamp body, which is secured, especially seated, in a rotatable manner on said molded part.

14. The apparatus as claimed in claim 1, wherein:
said clamp body has a screw thread, into which a clamping screw can be screwed; and said clamp body, clamping screw and screw thread interact in such a manner, that, in the case of screwing in said clamping screw, the bared end of the connecting line of the control/evaluation unit is affixed.

* * * * *